A. W. STEPHENS.
STOPPER EXTRACTOR.
APPLICATION FILED JUNE 5, 1909.
952,085.
Patented Mar. 15, 1910.
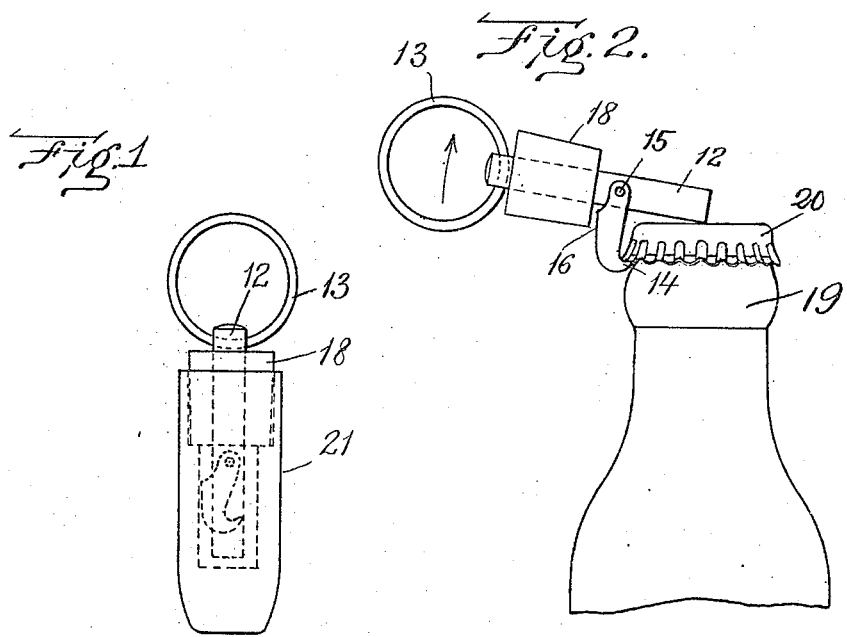
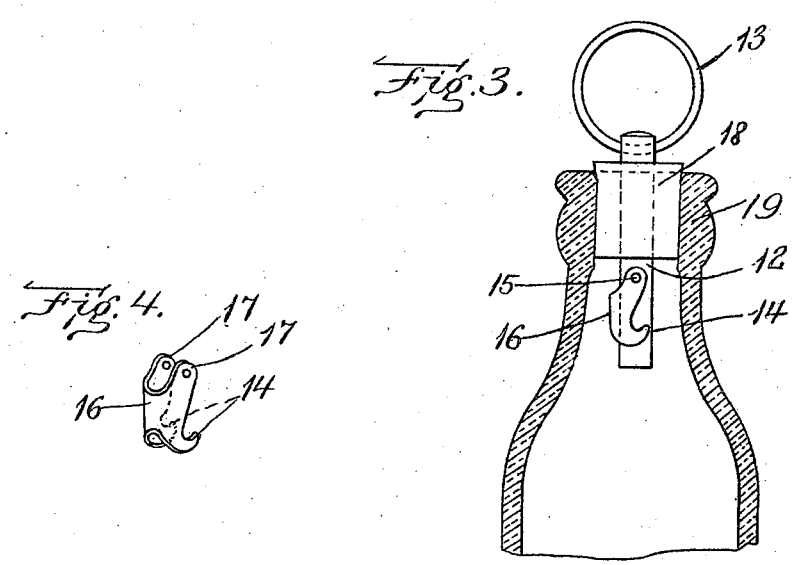
Witnesses.
Inventor.

UNITED STATES PATENT OFFICE.

AUGUSTUS W. STEPHENS, OF WALTHAM, MASSACHUSETTS.

STOPPER-EXTRACTOR.

952,085. Specification of Letters Patent. Patented Mar. 15, 1910.

Application filed June 5, 1909. Serial No. 500,283.

*To all whom it may concern:*

Be it known that I, AUGUSTUS W. STEPHENS, of Waltham, in the county of Middlesex and State of Massachusetts, have invented certain new and useful Improvements in Stopper-Extractors, of which the following is a specification.

This invention has for its object to provide an implement adapted to be used in removing the crown cap which closes the neck of a bottle, the said implement being also adapted to close the bottle after the removal of the crown cap.

The invention consists in the improvements which I will now proceed to describe and claim.

Of the accompanying drawings, forming a part of this specification,—Figure 1 represents a side elevation showing my improved implement contained in a case and adapted to be carried in a pocket. Fig. 2 represents a side view showing the implement as used for removing a crown cap from a bottle. Fig. 3 represents a similar view showing the implement as used to close the neck of the bottle. Fig. 4 represents a perspective view of the hook detached.

The same reference characters indicate the same parts wherever they occur.

In the drawings, 12 represents a straight rod or shank which is preferably a short piece of stout wire. One end of the shank is provided with a suitable handle 13 which is preferably a ring engaged loosely with the shank. The ring may be split and adapted to serve as a key-ring if desired.

14 represents a hook which is pivoted at 15 to the shank, the pivot 15 being located at a distance from the inner end of the shank. The hook is preferably made from a blank of sheet metal including a body 16 and side portions 17 the whole being concaved to fit over and closely embrace the rod or shank 12. Ears 17 are provided, through which the pivot pin 15 is passed. The lower end of the body 16 is rounded and provided with hook-shaped prongs which collectively comprise the hook 14.

18 represents a collar which may be made or rubber, cork, or other suitable compressible material and is adapted to serve as a stopper to close the neck 19 of a bottle. The collar is engaged with the shank 12 by passing the latter through a hole formed for its reception in the collar, the latter being located between the handle 13 and the hook.

The described implement is adapted to be used, as illustrated in Fig. 2, for the purpose of removing from the bottle neck 19 a crown cap 20 of any ordinary construction, one end of the shank being placed upon the central portion of the cap and the hook engaged with the flange of the cap. A movement of the implement in the direction indicated by the arrow in Fig. 2, will cause the hook to disengage the cap from the bottle neck. During this operation the collar 18 furnishes a bearing for the operator's finger, said bearing presenting a large surface area and being of yielding material so that the pressure on the operator's finger does not occasion discomfort. The hook is adapted to swing inwardly upon the shank, as indicated in Figs. 1 and 3, so that, after the removal of the cap 20, the collar and the inner end portion of the shank with the hook thereon may be inserted in the neck of the bottle, as shown in Fig. 3. It sometimes happens that after a crown cap has been removed from a bottle the hook member is not folded back into position against the shank 12. In such instances, when the implement is inserted in the bottle to serve as a stopper, the mouth of the bottle will engage the rounded lower end of the hook, and acting against the rounded edges thereof in the nature of a cam, will close the hook against the shank as the implement is inserted into position. It will be seen therefore, that, after a bottle has been opened, the implement may be used to temporarily close it.

The form of the implement is such that it may be inserted in a case 21 having a cavity, the outer portion of which is formed to fit the collar, while its inner portion is formed to receive the inner end portion of the shank and the hook thereon. The collar in this case serves to couple the implement to the case, so that the implement may be conveniently and safely carried in a pocket.

I claim:—

An implement of the character described comprising a shank having a handle at one end, a concave body provided at one end with ears pivotally connected to said shank, and hooks at the other end, the hook end of said body being rounded, said concave body being constructed to embrace said shank, and a compressible collar surrounding said shank and located between said handle and said concaved body.

In testimony whereof I have affixed my signature, in presence of two witnesses.

AUGUSTUS W. STEPHENS.

Witnesses:
C. F. BROWN,
P. W. PEZZETTI.